Nov. 3, 1953  C. H. LATIMER-NEEDHAM  2,657,960
PISTON
Filed March 6, 1950
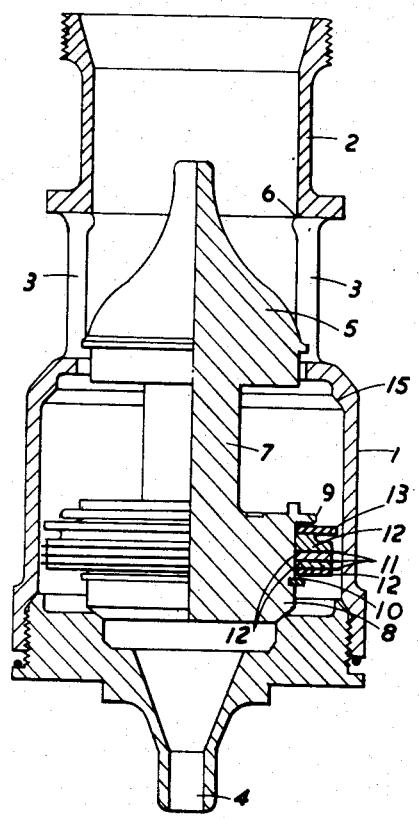
Inventor
C. H. Latimer-Needham
By Watson, Cole, Grindle + Watson
Attorney Patented Nov. 3, 1953

2,657,960

UNITED STATES PATENT OFFICE 2,657,960

PISTON

Cecil Hugh Latimer-Needham, North Bersted, Bognor Regis, England, assignor to Flight Refuelling Limited, London, England, a British company Application March 6, 1950, Serial No. 147,796
Claims priority, application Great Britain
March 7, 1949

6 Claims. (Cl. 309—4)

This invention relates to improvements in pistons.

The object of the invention is the provision of an improved piston capable of operation with a working fluid consisting of a liquid containing suspended solid matter in a finely divided state, such as sludge, a powdery matter or fine sand, and having in such conditions a minimum liability to seizure and a greatly reduced tendency to wear and scoring of the cylinder walls.

This object is accomplished according to the invention by forming the piston of a number of thin relatively flexible shim washers, having a small clearance in the cylinder bore loosely assembled on a central core, preferably with some radial clearance, and separated from one another by a number of rigid spacing washers of smaller external diameter having an easy sliding fit on the core, the complete stack of shim and spacing washers being retained between end collars in fixed axial relationship with the core, preferably with a small but appreciable degree of freedom to float endwise between the collars.

The outer edges of the shim washers stand proud of the spacing washers, and this, together with their flexibility, and in the preferred construction, their radial clearance on the core and their limited freedom to float endwise, which is preferably sufficient to ensure that no one of the shim washers is tightly gripped between the adjacent spacing washers, enables the edges of the shim washers to deflect and allow small particles of suspended solid matter to pass them without causing seizure of the piston and with reduced tendency to damage the cylinder walls, and at the same time to exert a scraper action which effectively prevents larger particles of solid matter from getting past the piston.

Preferably the diametral clearance in the cylinder bore of the spacing washers is about thirty times the thickness of the shim washers. Preferably, again, the thickness of the shim washers is of the order of one five-hundredth of their external diameter; and the total end float of the stack of shim- and spacing-washers between the retaining collars is of the same order as the thickness of each shim washer.

How these objects, and others as may hereafter appear, are achieved will be better understood from the following description having reference to the accompanying drawing illustrating by way of example an embodiment of the invention, the scope of which is defined in the appended claims, as applied to a valve-operating piston. The drawing shows in axial section a combined cylinder and valve body enclosing a combined piston and valve member shown half in axial section and half in elevation.

The cylinder 1 is formed integrally with a valve body 2 in which are arranged ports 3. A valve member 5, of needle form, slides in the body 2 to co-operate with a seating 6 therein and has an integral stem 7 connected with the piston. The latter comprises a core 8 formed integrally with stem 7 and having an integral collar 9, a second collar formed by a split spring ring 10 located in a circumferential groove in the core, and thereby held in fixed axial relationship with the core, three thin flexible shim washers 11 loosely supported on the core and four thicker, rigid spacing washers 12 also loosely supported on the core and arranged alternately with the shim washers. There is also mounted on the core 8, between the stack of washers 11, 12 and the collar 9, a sealing washer 13, which seats on a shoulder 15 of the cylinder 1 when the valve member 5 meets its seating 6, but this sealing washer is not an essential element of the piston structure according to the invention, being essentially a part of the valve assembly. The cylinder 1 is provided with an inlet 4 for admitting the working fluid below the piston.

In the example illustrated the interior diameter of the cylinder is about 2.4 ins., the thickness of each of the shim washers 11 is 0.005 in., their diametral clearance in the cylinder bore is between 0.002 and 0.006 in., and their diametral clearance on the core 8 is from 0.01 to 0.017 in. The spacing washers 12 are an easy sliding fit on the core 8 and their diametral clearance in the cylinder bore is 0.15 in. Their thickness is not critical; in the present example each of them has a thickness of about 0.064 in., except that the one next the sealing washer 13 is thicker. The stack of washers 11, 12 is assembled with some end clearance between the collars 9, 10, the total end clearance in the example illustrated being between 0.0035 and 0.004 in.

The flexibility of the shim washers, together with the end float and their radial clearance on the core and their greater diameter, which causes them to stand proud of the spacing washers, enables them to deflect and allow small particles of solid matter to pass them without causing seizure of the piston or damaging the cylinder walls seriously.

From the preceding detailed description and the graphic disclosure, it will be readily apparent that the shims 11, when made of the extreme thickness specified (circa 0.005 inch) and standing proud of the outer periphery of the spacing washers 12 a distance of approximately one-seventh of an inch, must be of a relatively stiff albeit extremely springy or resilient nature. These stated dimensional and positional qualifications naturally preclude the use of soft rubber or fabric gaskets in place of the applicant's shims. In order for the projecting portions of such soft gaskets to support their own weight, they would have to be made of a thickness far beyond any degree understandably associated with the connotation of the word "shim," and would also probably have to be extended into bearing contact with the cylinder wall, which of course is entirely outside of the purview of the applicant's invention.

In the particular example illustrated the working fluid admitted through inlet 4 is the same as that whose flow through the valve body 2 and ports 3 is controlled by the valve member 5. Any fluid escaping past the shim washers 11 of the piston is therefore carried away through ports 3 and mixes with the stream of fluid controlled by the valve.

The dimensions and clearances stated above are to be considered as illustrative only, being those appropriate to a specific application; it is not their absolute magnitudes and limits that are important, so much as their relative magnitudes, approximate limits for which have been mentioned in the introductory part of this specification.

I claim:

1. An essentially loosely fitting piston and cylinder assembly adapted for use with a working fluid which may contain suspended solid matter in a finely divided state, said piston comprising a central core, a number of relatively flexible spring shim washers of small thickness mounted on the core and having a small clearance with respect to the inner walls of the cylinder, a number of thicker, rigid, spacing washers of smaller diameter than the shim washers being mounted on the core to alternate with the shim washers, and two end collars in fixed axial relationship with the core, between which collars the stack of spring shim washers and relatively rigid spacing washers is retained, the resilience of said shim washers being such as to permit the margins thereof which protrude beyond the periphery of said rigid spacing washers to resiliently deflect appreciably in an axial direction to prevent binding and seizing of the piston within the cylinder on account of the presence of such finely divided matter.

2. A construction as claimed in claim 1, in which the end collars are so axially spaced that the spring shim and spacing washers have a small freedom to float endwise on the core.

3. A construction as claimed in claim 1, in which the external clearance of the spacing washers with respect to the inner walls of the cylinder is of the order of thirty times the thickness of the shim washers.

4. A construction as claimed in claim 1, in which the thickness of the shim washers is of the order of one five hundredth of their external diameter.

5. A construction as claimed in claim 2, in which the total end float of the stack of shim- and spacing-washers between the end collars is of the same order as the thickness of one shim washer.

6. A construction as claimed in claim 1, in which the shim-washers have an appreciable diametral clearance on the central core as well as from the cylinder wall.

CECIL HUGH LATIMER-NEEDHAM.

References Cited in the file of this patent

UNITED STATES PATENTS

| Number | Name | Date |
|---|---|---|
| Re. 2,763 | Wood | Sept. 10, 1867 |
| 733,665 | Lemp | July 14, 1903 |
| 949,993 | Blanchard | Feb. 22, 1910 |
| 1,283,091 | Crawford | Oct. 29, 1918 |
| 1,754,625 | Henning | Apr. 15, 1930 |
| 2,018,205 | Evans | Oct. 22, 1935 |
| 2,456,066 | Kempton | Dec. 14, 1948 |

FOREIGN PATENTS

| Number | Country | Date |
|---|---|---|
| 3,158 | Great Britain | Feb. 7, 1902 |